United States Patent [19]
Ferguson et al.

[11] 3,719,878
[45] March 6, 1973

[54] DIGITAL AUTOMATIC CONTROL SYSTEM WITH PSEUDO POSITION FEEDBACK AND MONITOR

[75] Inventors: Donald C. Ferguson, Scottsdale; Frederick W. Lynch; Gerald F. Simons, both of Phoenix, all of Ariz.

[73] Assignee: Sperry Rand Corporation, Great Neck, N.Y.

[22] Filed: Sept. 27, 1971

[21] Appl. No.: 184,133

Related U.S. Application Data

[62] Division of Ser. No. 31,986, April 27, 1970.

[52] U.S. Cl. ................318/565, 318/564, 318/562, 318/685, 318/696
[51] Int. Cl. ............................................G05b 23/02
[58] Field of Search......318/603, 564, 565, 685, 696, 318/562

[56] References Cited

UNITED STATES PATENTS

| | | | |
|---|---|---|---|
| 3,644,720 | 2/1972 | Falk | 318/603 X |
| 3,412,280 | 11/1968 | DeGrande | 318/565 |
| 3,462,661 | 8/1969 | Nelson | 318/564 X |
| 3,643,146 | 2/1972 | Ferguson et al. | 318/603 X |

*Primary Examiner*—T. E. Lynch
*Attorney*—S. C. Yeaton

[57] ABSTRACT

An automatic control system using digital techniques to drive a stepper motor for providing precisely controlled incremental output. A preselected output position triggers a synchronizing signal to insure periodic alignment between the input signal and the corresponding output control position. Monitoring capability is provided by a memory comparison system and thereby provides a fail-operational feature. A multiplexing capability may be incorporated.

5 Claims, 3 Drawing Figures

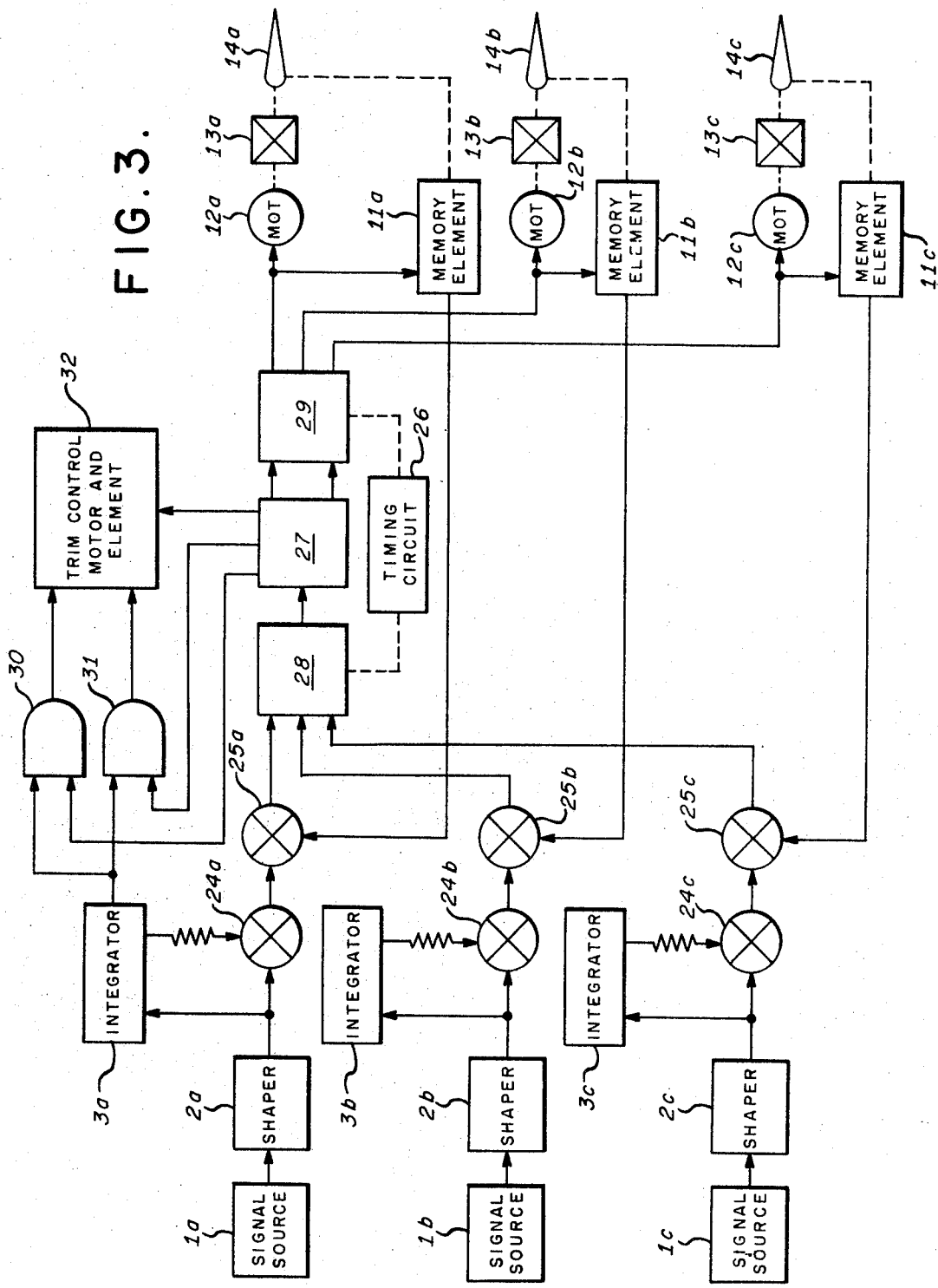

3,719,878

DIGITAL AUTOMATIC CONTROL SYSTEM WITH PSEUDO POSITION FEEDBACK AND MONITOR

CROSS REFERENCE TO RELATED APPLICATION

This is a division of application Ser. No. 31,986 filed Apr. 27, 1970, entitled "Automatic Control System with Pseudo Position Feedback and Monitor," in the names of Donald C. Ferguson, Frederick W. Lynch and Gerald F. Simons.

BACKGROUND OF THE INVENTION

1. Field of the Invention

The invention relates to a control system requiring a precise incremental position change of the controlled element in proportion to the change of the indicated input controlling signal. Digital techniques are known to provide such a capability but previous implemented systems were too complex mechanically and electronically to be feasible for any but the most elaborate systems. Analog systems can provide an incremental output change but require extensive and complex mechanical implementations which prohibit the use of the system where low cost and weight are major considerations.

2. Description of the Prior Art

In prior analog feedback control systems the positioning motor had to operate in conjunction with a position transducer connected to the controlled apparatus. In operation, the desired input signal was fed to each and the disparity in position of the controlled apparatus between the existing and the desired position, as determined by the transducer, controlled the amount of movement of the positioning motor. The system was a highly complex electromechanical system requiring delicate and finite adjustments to amalgamate the mechanical and the electrical portions.

Additionally, in analog responsive motor systems, the motor will overshoot until an overshoot error signal is generated. Oscillation about the desired position ensues unless the further complexity of velocity control is resorted to.

Prior digital control techniques, or more accurately termed, pseudo digital control techniques, required complex analog-to-digital and digital-to-analog converters. The positioning motor required an analog signal and some feedback means to the motor driving circuits from some position determination means attached to the controlled apparatus.

The present system obviates the previously required feedback means dependent upon the position of the controlled element and embodies true digital techniques for positioning the controlled apparatus.

SUMMARY OF THE INVENTION

An automatic displacement feedback control system is described which uses digital techniques for signal processing and to drive a servomotor of the stepper motor type by controlling the number of pulses fed to the motor. At the same time, the same number of pulses or steps are fed to a volatile memory, the output of which provides a pseudo feedback to close the loop. The control system provides precise and accurate control without the usual mechanical and electrical complexity of servo driven feedback mechanisms. The monitoring system compares the steps fed to the volatile memory element to an identical memory element driver fed from the motor mechanics. This monitoring system provides a fail-operational characteristic. Multiplexing equipment may be added to the basic system where a plurality of inputs and respective controlled elements are utilized.

A primary purpose of the disclosed system is that of providing a low cost digital feedback control system.

Another object of the invention is to provide a monitoring capability to obtain a fail-operational capability in a digital system.

Another object of the invention is to provide a light weight, low cost control system that is highly reliable and suitable for implementation in aircraft.

Another object of the invention is to provide a control system suitable for implementation in drone aircraft.

Another object of the invention is to provide a control system operable by either remote radio control or by a position orientation system incorporated within the device to be controlled.

Another object of the invention is to provide a control system easily and inexpensively adaptable to either an analog or digital input signals.

BRIEF DESCRIPTION OF THE DRAWINGS

FIG. 3 illustrates a similar system with multiplexing capability.

DESCRIPTION OF THE PREFERRED EMBODIMENT

Figure 1:
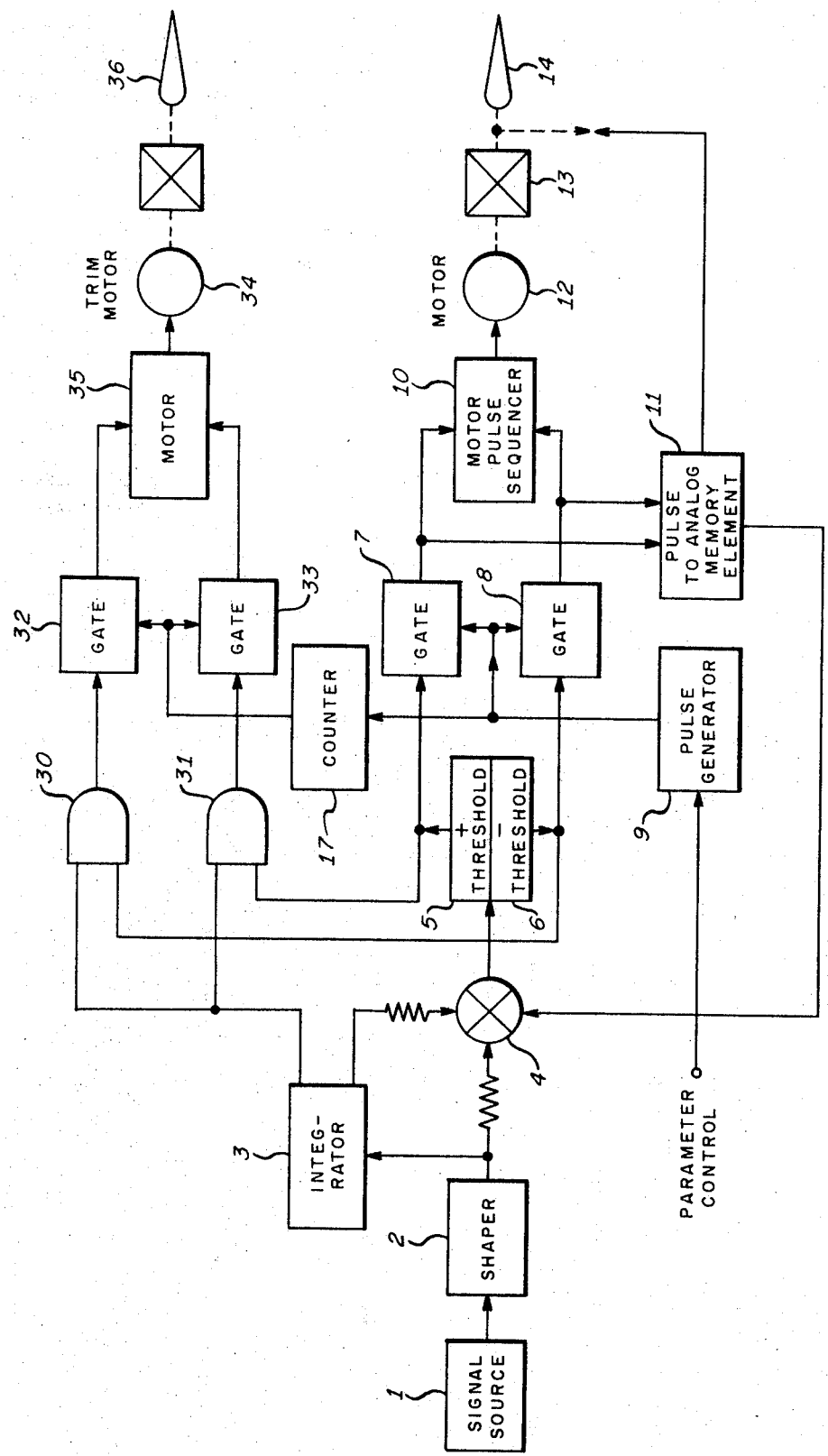
FIG. 1 illustrates a preferred embodiment of the basic digital automatic control system.

Referring to FIG. 1, a signal source 1 provides an output responsive to an implemented control signal. In one application, the signal source could be a position sensor such as a gyroscope responsive to the attitude of an airplane. For the sake of simplicity of terminology and as an exemplary application, the following description will be related to an aircraft automatic flight control system. The controlled element 14 may then be considered as any one of the three primary axis control surfaces. The output of the signal source 1, whether it be an error signal from a gyroscope or some other signal, is representative of a desired or required movement of the controlled surface 14. The signal, which may be an analog signal, is passed through a shaping circuit 2 so that it conforms with the system dynamics and thence to a summing junction 4. Conventional integration means 3 may be employed at the output of the shaper 2 and the integrated input signal may be fed to the summing junction 4 to cancel out any long term or persistent error in aircraft attitude. The output of the summing junction 4 is coupled to two threshold devices 5, 6, one responsive to a positive-going signal and the other to a negative-going signal. The threshold level of each device may be determined mathematically or empirically, dependent upon the sensitivity of the response desired. A signal of sufficient magnitude will trigger either the positive or negative threshold devices to thereby produce an enabling signal at the respective gate 7 or 8.

Associated with gates 7 and 8 is a pulse generator 9. The repetition rate of the pulse generator 9 may be preset or it may be variable through parameter control means. As will be later described, the pulse repetition rate is proportional to the speed at which the controlled element 14 will react in response to the input signal.

When either gate 7 or 8 is enabled by the threshold devices 5, 6, pulses from the pulse generator 9 are fed to the motor pulse sequencer 10. The motor pulse sequencer 10 may be of any configuration whereby the pulse signals are converted to driving signals for rotating the stepper motor 12. The description of a configuration which was found satisfactory follows. The output of gates 7 and 8 feed an up/down counter of module three mode and has the output decoded in a decoder. The output of the decoder activates the appropriate sets of coils in the commanded order within the stepper motor 12 causing the rotor of the stepper motor 12 to rotate in response to the number of pulses received. The direction of rotation is determined by whether gate 7 or 8 is enabled. Attached to the stepper motor 12 is a reversible gear train 13, which in turn is attached to the controlled element 14. The characteristics of this motor make a clutch unnecessary.

Concurrently with each pulse supplied to the motor pulse sequencer 10, a pulse is supplied to a pulse to analog memory element 11. Appropriate logic functions within the memory element 11 causes it to count up or count down in response to the pulses received. The pulses received by the memory element 11 may be considered as representative of the rotational change of the stepper motor 12 as they are the pulse commands and an assumption is therefore made that the stepper motor 12 has in fact rotated in response to the pulse command.

The output analog signal of the memory element 11 equivalent to the pulse command is fed back to the summing junction 4. The algebraic sum of the signal from the shaper 2, integrator 3 and memory element 11 then becomes the signal presented to the threshold devices 5 and 6. If it is assumed that the output of the integrator 3 is zero or negligible, then, when the value of the error signal from the memory element 11 reaches the value of the error signal from the shaper 2, the output of the summing junction 4 is below the threshold limit or zero. The enabling signal is then turned off and the opened gate closes causing the pulse train to the motor pulse sequencer 10 to cease. At this time, the motor position and the pulse-to-analog memory element output voltage are in coincidence.

The system as described is a zero-seeking system in that the ultimate position of the controlled element 14 is that of the reference or zero position. By taking advantage of this feature, a quasi-synchronizing signal can be developed periodically. If there is attached to the controlled element 14 a device which is responsive to the zero position of the controlled element 14, an output of the device may be used to clear the memory element 11 and periodically synchronize the memory element 11 to the controlled element 14. Such a device operating on the memory element 11 will then effectively remove any noise pulses that have entered the system and created an output from the memory element 11. Thus, any spurious pulses that have entered the system since the last time the controlled element 14 was at zero are erased and the system is again synchronized.

If desired, a position other than the zero position of the controlled element 14 may be used as the synchronizing position. Such a modification may be accomplished by mechanically establishing a new position of the controlled element 14 as the point at which a synchronizing signal is emitted from the device and so recognized by the memory element 11. The memory element 11 must also be adjusted so that it contains a signal equivalent to the displacement of the controlled element 14 from the zero position. In this manner, the content of the memory element 11 will synchronize with the preselected position of the controlled element 14 each time that the controlled element 14 travels through synchronizing point and spurious signals will be deleted.

The system described above may also be used to advantage to insure synchronization during initial start up. This may be accomplished by initiating a fixed program to the stepper motor 12 to cause it to move to the zero position. At that point the memory element 11 output will become zero and match the controlled element 14 zero position.

In any aircraft, a change of center of gravity about the pitch axis or the roll axis will have a tendency to affect the aerodynamic path of the aircraft. In the system as described, this change can be compensated for by an appropriate movement of the controlled element 14. However, to rely on the basic system presents a major disadvantage. When the aircraft is under the control of the system, the stepper motor 12 is quite capable of holding the necessary unbalance at the controlled element 14, however, upon disengagement of the system, a severe transient can result in the aircraft attitude. To overcome this disadvantage, this system or any other aircraft control system should incorporate a trim feature.

The instant control system configuration lends itself admirably to a trim system which can utilize the simplicity aspects of the instant invention. The trim configuration is obtained by applying the output from the integrator 3 to each of two AND gates 30 and 31. The second input from each AND gate is obtained from one of the threshold circuits 5 and 6. One of the AND gates will then be responsive to the positive threshold and the other to the negative threshold. Under a condition where there is an output from both the integrator 3 and one of the threshold circuits, a demand for trim is present. The output of the activated AND gate enables the associated enable gate 32 or 33 permitting pulses emanating from the pulse generator 9 through counter 17 to energize the trim motor pulse sequencer 35 and drive the trim stepper motor 34 and thereby operate the respective trim tab 36. The operation of the system between the enabling gates and the trim tab is similar to that described for the basic system.

A satisfactory trim system requires that the trim operation be slow so as not to cause a destabilizing effect. Previously, such an effect has been obtained by massive and extensive gearing operations. The instant invention obviates the need for such cumbersome devices as the speed of the trim stepper motor 34 is a direct function of the pulse repetition rate of the pulse generator 9. In most cases the pulse repetition rate in the basic system is too high for satisfactory trim control. By the addition of a simple counter 17, the extant pulse repetition rate can be reduced to any satisfactory level.

A further feature available from the control system is that of an automatic control wheel steering mode. If the pilot overpowers the controlled element 14, the engage attitude will change causing the error signal from the signal source 1, i.e., a gyroscope, to build up. This will enable gates 7 or 8 through thresholds 5 or 6 and pulses from the pulse generator 9 will be fed to the memory element 11 until its output to the summing junction 4 cancels the error signal. While the controlled element 14 was being overpowered by the pilot, the stepper motor 12 could not move in response to the pulses. Since the stepper motor position is physically independent of the memory element 11, the control system is zeroed and a new synchronized attitude has been established.

Figure 2:
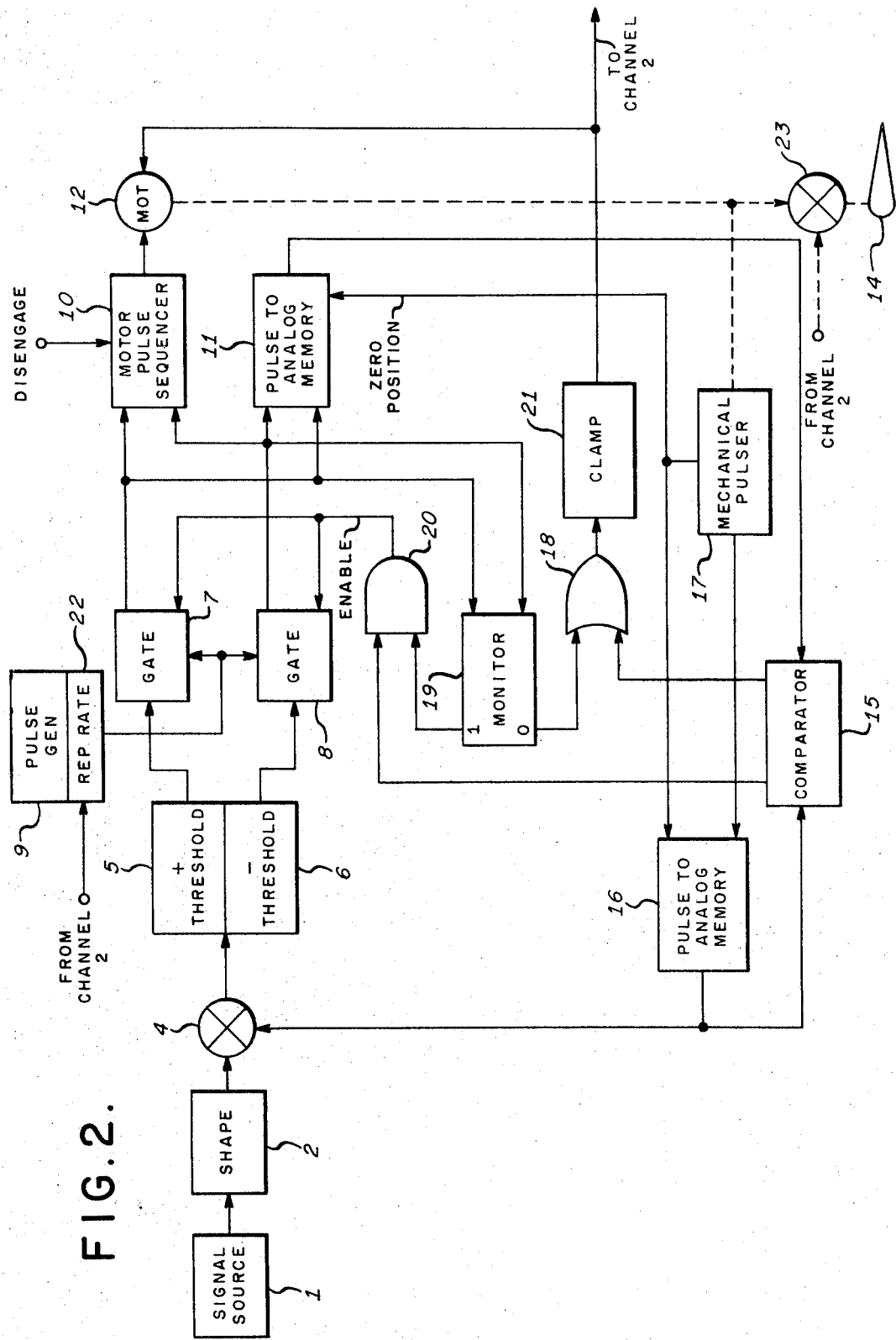
FIG. 2 illustrates a digital automatic control system of the type shown in FIG. 1 and including a fail-operational feature.

The basic system previously described easily lends itself to a fail-operational mode will only slight modifications, and a detailed explanation of the common elements and common operation will not be undertaken. Referring to FIG. 2, attached to the stepper motor 12 by mechanical means is a mechanical pulser 17. This mechanical pulser 17 is a sector switch with appropriate contacts to generate a pulse each time that the stepper motor 12 rotates one increment. The output of the mechanical pulser 17, representing the actual controlled element movement, is summed through pulse-to-analog memory 16, at the summing junction 4 with the attitude information provided by the signal source 1. This operation is similar in concept to that described in the basic system. The zero position synchronizing feature in the basic system is herein accomplished by a pulse responsive movement through the zero position in the mechanical pulser 17. This pulse is fed to both pulse-to-analog memory elements 11 and 16 and clears them of spurious error causing pulses.

The monitoring feature is performed by comparing the mechanical output of the system to the motor drive inputs and is accomplished in the following manner. The output of the mechanical pulser 17 is fed through the pulse-to-analog memory 16 to obtain an analog output. This analog output establishes one input to comparator 15. The second input to comparator 15 is obtained from the pulse-to-analog memory 11 and represents the motor drive input. A direct pulse comparison rather than analog signal comparison, could be made, but phasing problems would be evident and compensatory circuitry would create additional unnecessary system complexity.

If the analog result of both pulses is not present during the sampling period, an output, through the OR gate 18 to clamp 21, initiates application of a d.c. voltage to two stepper motor windings through the motor pulse sequencer 10 and locks the stepper motor 12. At the same time, the normally commanded motor pulse sequence 10 output is quashed. If the analog result of both the pulses is present at the comparator 15 during the sampling period, an output is fed to one of the inputs of AND gate 20.

Under normal operation, one of the operating gates, 7 or 8, will feed a pulse to monitor 19. Monitor 19 will in turn send a pulse to the second input of AND gate 20. The AND gate 20 will then enable gates 7 or 8. If a failure should occur in the threshold circuits or in the gates 7 and 8 such that pulses from each gate are simultaneously emitted to the motor pulse sequencer 10 and the pulse-to-analog memory 11, the same pulse will also be present at the input to monitor 19. Under that condition, the monitor 19 will recognize that an error exists and send a pulse to OR gate 18. The OR gate 18 will then clamp the stepper motor 12 as described for a failure indication seen by comparator 15.

In a fail-operational system the dual servoes controlled by each channel are coupled through a differential gear train to provide a constant torque output upon loss of a stepper motor. To obtain constant torque under such a condition, the gear train angular velocity output is necessarily halved. The desired effect on the controlled element 14 in relation to the desired effect as measured by the input signal is destroyed. This condition may be obviated by initiating a signal from the motor clamping circuit 21 which will double the pulse repetition rate of the pulse generator 9 in the parallel or second channel. The speed of the stepper motor 12 of the good or second channel will now double causing the gear train angular velocity output to increase to its former rate.

Referring to FIG. 3, there is illustrated a modification of the basic system contained in and described in respect to FIG. 1, wherein a multiplexing system is added. The inputs, position sensors 1a, 1b, 1c, shapers 2a, 2b, 2c, integrators 3a, 3b, 3c, and summing junctions 24a, 24b, 24c, represent the input signal from each of the three axis in an automatic pilot system directed to airborne vehicles. The trim features associated with the a input may be for the pitch axis and operates as previously described. In addition, the other axis may also contain similar trim features. Each of the inputs is fed as a parallel input to a first multiplexing unit 28, which my be by time, frequency, or phase division. The serial output therefrom is fed to unit 27. Unit 27 may comprise the circuit as described in respect to FIG. 1 including the threshold circuits 5,6, gates 7,8, pulse generator 9, and motor pulse sequencer 10. The output of unit 27 from the motor pulse sequencer 10 is fed to a second and complementary d.c. multiplexing unit 29. Associated with both multiplex units 28 and 29, there is a timing circuit 26 of any configuration to synchronize the units.

The outputs to stepper motors 12a, 12b, 12c, memory elements 11a, 11b, 11c, gear trains 13a, 13b, 13c, and controlled surfaces 14a, 14b, 14c, correspond in function to the above-discussed inputs. The memory element output associated with each stepper motor is combined with its respective input signal at summing junction 25a, 25b or 25c. At the summing junction, the feedback signal modifies the respective input signal representing the desired position change of the respective controlled element.

A zero position sensing device is associated with each controlled element and upon activation will clear or realign the respective memory element. Thereby, synchronization between the actual controlled element position and the commanded controlled element position will be effected.

The trim function associated with channel *a* operates in the same manner as previously discussed. The output from unit 27 to AND gates 30 and 31 is the same output shown in FIG. 1 from the threshold devices 5 and 6. Unit 32 includes the electronic trim function circuitry described in FIG. 1 and the output from unit 27 thereto is the output of the pulse generator 9 to the counter 17. As a further modification, any of the other input signals may include a trim feature.

A major advantage of the above-described system is that of reduction of required components. Only one unit 27 with its circuitry is required. The addition of the multiplex units 28 and 29 does not represent a substantial increase of components as any of many well known simple switching circuits may be employed.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. A fail-operative, dual channel control system, each channel comprising,
   an input signal source indicative of a desired control function,
   electronic circuitry means for processing said input signal into an equivalent digital command signal output,
   said circuitry means including a pulse generator having a variable repetition rate, and responsive to the input signal of said circuitry means for energizing said stepper motor to operate at a speed dependent upon the pulse repetition rate,
   a controlled element responsive to said stepper motor,
   a monitoring means for said circuitry means indicative of a failure within said circuitry means,
   a comparator means for indicating a failure of movement of said controlled element in response to said command signal,
   means for disabling said channel upon failure of one of said channels, and
   means for increasing the repetition rate of said pulse generator in the remaining channel upon the failure of one of said channels whereby the rotational speed of said stepper motor is increased.

2. The system as claimed in claim 1 wherein said electronic circuitry comprises positive and negative threshold means for inhibiting an input signal of predetermined absolute magnitude,
   a plurality of gates enabled by said threshold means,
   a motor pulse sequencer, and
   said motor pulse sequencer enabled by said pulse generator through one of said enabled gates, whereby said stepper motor is caused to rotate.

3. The system as claimed in claim 1 wherein said monitoring means comprises a monitor device responsive to each of said gates for providing a first output in response to an input from one of said gates and a second output in response to a simultaneous input from two or more of said gates,
   an AND gate responsive to said first output and said comparator means for enabling said plurality of gates,
   an OR gate responsive to said second output and representative of a failure of said circuitry, whereafter said channel is disabled.

4. The system as claimed in claim 1 wherein said comparator means comprises a comparator device responsive to said input signal and to a signal representative of the actual movement of said controlled element whereby said comparator provides a first output on coincidence of the input signals to said comparator and a second output on lack of coincidence of the input signals to said comparator,
   an AND gate responsive to said first output and said monitoring means for enabling said plurality of gates,
   an OR gate responsive to said second output and representative of a failure of said circuitry, whereafter said channel is disabled.

5. The system as claimed in claim 1 wherein said disabling means comprises a clamping means responsive to a failure indicating signal from either said monitoring means or said comparator means for disengaging said motor pulse sequencer, and
   a variable repetition rate pulse generator responsive to said clamping means whereby the repetition rate of said pulse generator is doubled.

* * * * *

UNITED STATES PATENT OFFICE
CERTIFICATE OF CORRECTION

Patent No. 3,719,878                    Dated March 6, 1973

Inventor(s) Donald C. Ferguson, Frederick W. Lynch and Gerald F. Simons

It is certified that error appears in the above-identified patent and that said Letters Patent are hereby corrected as shown below:

In the Claims:

Claim 1: Column 7, line 24, after "system" insert-- having two channels--.

Column 7, Between lines 30 & 31, insert the following paragraph--a stepper motor responsive to said digital command signal output--.

Column 7, lines 43 and 44, after "failure" delete "of one of said channels" and insert--thereof--.

Column 8, line 1, delete "one of said channels" and insert--the failed channel--.

Column 8, line 2, after "motor" insert--in said remaining channel--.

Claim 3: Column 8, line 12, change "1" to--2--.

Claim 4: Column 8, line 24, change "1" to--2--.

Claim 5: Column 8, line 38, change "1" to--2--.

Signed and sealed this 23rd day of April 1974.

(SEAL)
Attest:

EDWARD M.FLETCHER,JR.                C. MARSHALL DANN
Attesting Officer                    Commissioner of Patents